United States Patent
Weinert et al.

(12) 
(10) Patent No.: US 6,383,651 B1
(45) Date of Patent: May 7, 2002

(54) POLYESTER WITH PARTIALLY FLUORINATED SIDE CHAINS

(75) Inventors: Raymond J. Weinert, Macedonia, OH (US); Edward N. Kresge, Watchung, NJ (US); Robert E. Medsker, Hartville; Daniel D. Woodland, Munroe Falls, both of OH (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/384,464

(22) Filed: Aug. 27, 1999

Related U.S. Application Data

(63) Continuation-in-part of application No. 09/244,711, filed on Feb. 4, 1999, which is a continuation-in-part of application No. 09/035,595, filed on Mar. 5, 1998, now abandoned.

(51) Int. Cl.$^7$ .......................... B32B 27/06; B32B 27/26; B32B 27/36; B32B 27/42
(52) U.S. Cl. ....................... 428/482; 428/480; 525/437; 525/438; 525/441; 525/443; 525/444; 525/444.5; 528/299; 528/300; 528/401; 528/402
(58) Field of Search .................................. 528/401, 402, 528/44, 45, 59, 65, 70, 299, 300; 524/462; 525/437, 438, 441, 443, 444, 444.5; 428/457, 458, 480, 482

(56) References Cited

U.S. PATENT DOCUMENTS

| | | |
|---|---|---|
| 3,100,722 A | 8/1963 | Hermann et al. |
| 3,834,823 A | 9/1974 | Seregely et al. |
| 3,922,457 A | 11/1975 | Barnwell et al. |
| 3,949,132 A | 4/1976 | Seregely et al. |
| 4,051,195 A | 9/1977 | McWhorter |
| 4,118,541 A | 10/1978 | Power et al. |
| 4,603,074 A | 7/1986 | Pate et al. |
| 4,686,275 A | 8/1987 | Bryant et al. |
| 4,746,576 A | 5/1988 | Ozu et al. |
| 4,857,396 A | 8/1989 | Otonari et al. |
| 4,898,981 A | 2/1990 | Falk et al. |
| 4,946,992 A | 8/1990 | Falk et al. |
| 4,988,123 A | 1/1991 | Lin et al. |
| 5,043,221 A | 8/1991 | Koleske |
| 5,045,624 A | 9/1991 | Falk et al. |
| 5,097,048 A | 3/1992 | Falk et al. |
| 5,230,954 A | 7/1993 | Sakamoto et al. |
| 5,324,764 A | 6/1994 | Fujita et al. |
| 5,361,164 A | 11/1994 | Steliga |
| 5,543,200 A | 8/1996 | Livigni et al. |
| 5,576,095 A | 11/1996 | Ueda et al. |
| 5,637,657 A | 6/1997 | Anton |
| 5,637,772 A | 6/1997 | Malik et al. |
| 5,649,828 A | 7/1997 | Kawashima |
| 5,650,483 A | 7/1997 | Malik et al. |
| 5,654,450 A | 8/1997 | Malik et al. |
| 5,663,289 A | 9/1997 | Archibald et al. |
| 5,668,250 A | 9/1997 | Malik et al. |
| 5,668,251 A | 9/1997 | Malik et al. |
| 5,674,951 A | 10/1997 | Hargis et al. |
| 5,681,890 A | 10/1997 | Takashi et al. |
| 5,703,194 A | 12/1997 | Malik et al. |
| 5,807,977 A | 9/1998 | Malik et al. |
| 6,168,866 B1 | 1/2001 | Clark |

FOREIGN PATENT DOCUMENTS

| | | |
|---|---|---|
| EP | 0 348 350 | 12/1989 |
| WO | WO 96/18699 | 6/1996 |
| WO | WO 96/23828 | 8/1996 |
| WO | WO 99/26992 | 6/1999 |
| WO | WO 99/45079 | 9/1999 |
| WO | WO 00/46270 | 8/2000 |

OTHER PUBLICATIONS

Letter to Southwest Texas Distribution, Inc. dated Mar. 5, 1998 to Greg Nernes from Barry Bastion, Product Manager, GenCorp.
Invoice to Southwest Texas Distribution, Inc. dated Apr. 9, 1998 from GenCorp.
10 pages of World Patent Index search results based on PVC and fluoro . . . coating.
4 pages of World Patent Index search results based on PVC and polyester coating.
40 pages of Chemical Abstract search results based on PVC and fluoro . . . coating.
25 pages of Chemical Abstract search results based on PVC and polyester.
CA entries and Derwent patent family printouts on JP 03275859; JP 04363370; JP 07004064; JP 07039812; JP 08283654; JP 6216941; JP 63248827.

*Primary Examiner*—Vivian Chen
(74) *Attorney, Agent, or Firm*—Robert F. Rywalski; Daniel J. Hudak

(57) ABSTRACT

A polyester polymer including at least one polyoxetane block of repeating units derived from polymerizing at least one oxetane monomer having at least one pendant —$CH_2$—O—$(CH_2)_n$—Rf group wherein said Rf group is partially or fully fluorinated is described. A preferred process for forming said polymer by reacting the hydroxyl terminated polymer with a polycarboxylic acid under appropriate conditions to form an ester linkage and then adding and reacting that product with polyester forming reactants.

32 Claims, No Drawings

POLYESTER WITH PARTIALLY FLUORINATED SIDE CHAINS

This application is a continuation-in-part of prior application Ser. No. 09/244,711, filed Feb. 4, 1999, entitled Easily Cleanable Polymer Laminates which was a continuation in part of prior application Ser. No. 09/035,595, filed Mar. 05, 1998, abandoned entitled Easily Cleanable Polymer Laminates, both of which are herein incorporated by reference.

FIELD OF INVENTION

This invention relates polyester polymers including blocks of polyoxetane derived from polymerizing monomer or monomers including oxetane monomers with partially fluorinated side chains. These polyesters have many of the desirable properties of fluorinated polymers and the ease of processability of the polyesters. The desirable properties of the fluorinated polymers are due to the partially fluorinated side chains and the tendency of the fluorinated side chains to be disproportionately present at any surfaces generated. These polymers are preferred in some embodiments over polyoxetanes with the partially fluorinated side chains as they are more easily incorporated and bound into a variety of polymers due to the polyester portion of the polymer.

BACKGROUND OF INVENTION

U.S. Pat. No. 5,650,483 describes the preparation of oxetane monomers useful to form oxetane polymers with pendant fluorinated chains. The oxetane polymers were characterized as having low surface energy, high hydrophobicity, and a low coefficient of friction. That patent is incorporated by reference herein for its teachings on how to prepare the oxetane monomers and polymers. In the reference the oxetane polymers could be formulated with isocyanates to form crosslinked compositions. Additional patents issued on variations of the oxetane monomers and polymers. These were U.S. Pat. Nos. 5,468,841; 5,654,450; 5,663,289; 5,668,250, and 5,668,251 also incorporated herein by reference.

Polyesters are a very useful class of polymers. They are used as molding or extruding polymers, as solvent or water dispersible polymers in coatings which can be cured with amino resins, as components in polyurethanes and epoxy materials, and when they are unsaturated in thermoset molding compositions for a variety of filled and/or fiber reinforced applications.

SUMMARY OF INVENTION

According to the present invention, it was discovered that a polyester resin having low surface energy, high hydrophobicity and a low coefficient of friction, which can result in improved stain and abrasion resistance, is produced by incorporating a hydroxyl terminated polymer (blocks) having repeating units from an oxetane monomer having pendant fluorinated groups thereon into a polyester. The hydroxyl terminated polymer may have other repeat units such as derived from the ring opening polymerization of cyclic ethers including tetrahydrofuran, propylene oxide or epoxy monomers. A preferred method of incorporating the polyoxetane into the polyester is to react the polyoxetane with a dicarboxylic acid or anhydride thereof under effective conditions to result in a half ester linkage between the polyoxetane and the diacid along with carboxylic acid terminal groups. Thereafter additional polyester repeating units can be added by reacting the terminal carboxylic acid groups with polyols or cyclic ethers and additional polyacids and/or anhydrides of polyacids. As polyesters are known to undergo ester interchange reactions one could generically list the reactants used to form the polyesters as polyesters and their precursors.

The preferred oxetane monomer for this application can have a single pendant $-CH_2-O-(CH_2)_n-$ Rf group where the Rf group is a partially or fully fluorinated linear or branched alkyl of from 1 to 20 carbon atoms, R is hydrogen or an alkyl of 1 to 6 carbon atoms, and n is from 1 to 3. Polyoxetanes with two pendant partially fluorinated groups per repeating unit could also be used with this technology. The terminology "partially fluorinated pendant group" will be used to describe the $-CH_2-O-(CH_2)_n-$ Rf group which is only partially fluorinated due to the $CH_2$ and $-(CH_2)_n$ portions.

DISCUSSION OF DETAILS AND PREFERRED EMBODIMENTS

The polyester resins are generally made by a condensation polymerization reaction, usually with heat in the presence of a catalyst, of a mixture of a polycarboxylic acid or its anhydride and a polyhydric alcohol. Preferred polycarboxylic acids are the dicarboxylic acids and their anhydrides. Fatty monobasic oils or fatty acids, mono-hydroxy alcohols and anhydrides may be present. The polyester may contain active hydrogen atoms, e.g., carboxylic acid groups and/or hydroxyl groups for reaction with the amino resin or may contain unsaturation for crosslinking by another mechanism such as copolymerization with ethylenically unsaturated monomers. Examples of some acids to use to form the alkyd resin or reactive polyester are adipic acid, azelaic acid, sebacic acid, terephthalic acid, phthalic anhydride, and so forth. Generally the aliphatic carboxylic acids have from about 3 to about 10 carbon atoms. Other carboxylic acids such as carbonic acid or phosgene may be used in lieu of carboxylic acids under appropriate conditions. The aromatic carboxylic acids generally have from about 10 to about 30 carbon atoms. The polyhydric alcohols (polyols) generally have from about 2 to about 20 carbon atoms and from about 2 to about 5 hydroxyl groups. Polymeric polyols such as formed from the polymerization of cyclic alkylene oxides may be used as a portion or all of the polyhydric alcohol. Polymeric polyols generally have number average molecular weights from 100 to 5,000 or 10,000. Examples of some polyhydric alcohols include ethylene glycol, propylene glycol, diethylene glycol, dipropylene glycol, glycerine, butylene glycol, 2,2-dimethyl-1,3-propanediol, trimethylol propane, 1,4-cyclohexanedimethanol, pentaerythritol, trimethylolethane and the like. Mixtures of the polyols and polycarboxylic acids can be used. An example of a suitable reactive polyester is the condensation product of trimethylol propane, 2,2-dimethyl-1,3-propanediol, 1,4-cyclohexanedimethanol, phthalic anhydride and adipic acid. Mixtures of these reactive polyesters (alkyd resins) can be used. Alkyd resins are well known as shown by the "Encyclopedia of Polymer Science and Technology," Vol. 1, 1964, John Wiley & Sons, Inc., pages 663–734; "Alkyd Resins," Martens, Reinhold Publishing Corporation, New York, 1961 and "Alkyd Resin Technology," Patton, Interscience Publishers, a division of John Wiley and Sons, New York, 1962. Some unsaturated polycarboxylic acids and unsaturated polyols may be used in the condensation reaction.

The polyester segments of the polyester may also be polymerized from cyclic ethers typically containing 2 or 3 carbon atoms in the ring and an anhydride (e.g. an unsaturated anhydride) using double metal complex cyanide catalysts. These polyesters can be used with a carboxylic half ester functionalized polyoxetane because of the occurrence of ester interchange reactions whereby polyester polymers cleave to Form carboxylic acid and hydroxyl end groups and then couple with other polyester fragments via an ester linkage. Generally any cyclic oxide can be utilized such as 1,2-epoxides, oxetanes, and the like, with the cyclic ether having a total of up to 18 carbons atoms, as for example 2 carbon atoms in the ring and up to 16 carbon atoms in the side chains. Such cyclic oxide monomers can also contain one or more aliphatic double bonds. Generally five-member unsaturated cyclic anhydrides are preferred, especially those having a molecular weight between 98 and 400. Mixed anhydrides can be used. Anhydrides include phthalic, itaconic, nadic etc. Halogenated anhydrides can also be used. Such polyesters are known to the art and described in U.S. Pat. No. 3,538,043 which is hereby incorporated by reference.

Amino resins can be used as a crosslinker (curative) for the polyester when it has terminal hydroxy and/or carboxylic acid groups. These amino resins generally include alkylated benzoguanamine-formaldehyde, alkylated urea-formaldehyde, or preferably alkylated melamine-formaldehyde resin. Mixtures of these resins can be used. These amino resins are well known and include those set forth in "Aminoplastics," Vale et al, Iliffe Books Ltd., London, 1964; "Amino Resins," Blair, Reinhold Publishing corporation, New York, 1959, "Modern Plastics Encyclopedia 1980–1981," pages 15, 16 and 25 and "Encyclopedia of Polymer Science Aid Technology," John Wiley & Sons, Inc., Vol. 2, 1965, pages 1 to 94.

If amino resins are used as curatives (crosslinkers) sufficient amounts by weight of the reactive polyester and amino resin are employed to provide a stain resistant, good durability and flexibility and good adhesion to a substrate if used in a laminate. These materials are desirably cured at temperatures of at least 150, 200, 250 or 400° F. or more (66, 93, 121, or 204° C.) for effective times in the presence of a minor amount by weight of an acidic catalyst such as boric acid, phosphoric acid, acid sulfates, hydrochlorides, phthalic anhydride or acid, oxalic acid or its ammonium salts, sodium or barium ethyl sulfates, aliphatic or aromatic sulfonic acids such as p-toluene sulfonic acid (preferred), methane sulfonic acid and the like.

The hydroxyl terminated polymer(s) including repeating units from an oxetane having at least one pendant —$CH_2$—O—$(CH_2)_n$—Rf group are prepared from the polymerization of oxetane monomer with partially fluorinated side chains. These polyoxetanes can be prepared according to the teachings of U.S. Pat. Nos. 5,650,483; 5,668,250 and 5,663,289 hereby incorporated by reference for those teachings. The oxetane monomer desirably has the structure

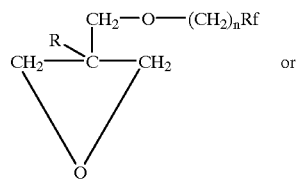

or

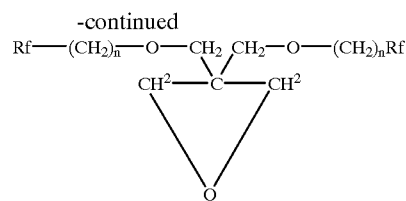

wherein each n is the same or different and independently is an integer from 1 to 3 and each Rf is the same or different and independently, on each monomer is a linear or branched alkyl group of 1 to 20 carbon atoms with a minimum of 25, 50 or 75 percent of the H atoms of each said Rf being replaced by F, or each Rf is the same or different and, independently, is an oxaperfluorinated polyether having from 4 to 60 carbon atoms; R being H or an alkyl of 1 to 6 carbon atoms; preferably each Rf is the same or different and independently has at least 85, more preferably at least 95% of said H atoms replaced by F, and most preferably is perfluorinated. Preferably said linear or branched alkyl group is of from 1 to 10, or 25 carbon atoms.

The repeating units from said oxetane monomers desirably have the structure

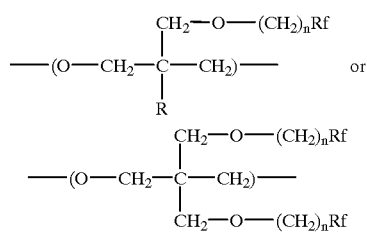

where n, Rf, and R are as described above.

The hydroxyl-terminated polymer(s) including repeating units from said oxetane monomers can have one or more terminal hydroxyl groups. They desirably have number average molecular weights from about 250, 1,000 or 5,000 to about 50,000. The polymer(s) can be a homopolymer or a copolymer of two or more different oxetane monomers. The polymer may also be a copolymer including non-fluorinated cyclic ether molecules having from 2 to 4 carbon atoms in the ring such as tetrahydrofuran and one or more oxetane monomers as described in the previously incorporated U.S. pat. No. 5,668,250. The copolymer may also include cc)polymerizable substituted cyclic ethers such as substituted tetrahydrofuran. The repeating unit from a tetrahydrofuran monomer has the formula to —(O—$CH_2$—$CH_2$—$CH_2$—$CH_2$—). The hydroxyl-terminated polymer optionally includes a cyclic oligomer of said oxetane monomer which may be a byproduct of the polymerization. In some embodiments, said hydroxyl terminated polymer includes up to 10, 20 or 30 wt % of said tetramer based on the weight of said hydroxyl terminated polymer(s).

It is desirable that the polymer including repeating units from an oxetane having at least one pendant —$CH_2$—O—$(CH_2)_n$—Rf group has one or more hydroxyl groups in that this provides a possible mechanism for this polymer to be chemically bound into the polyester. The relative amount of bound and fugitive partially fluorinated polyoxetane has not been measured in some prior polyester compositions and the bound portion may be a small or large percentage of the total oxetane repeating units.

It is desirable to prereact the hydroxyl terminated partially fluorinated polyoxetane (polyoxetane block) with the polyester forming components to increase the percentage of partially fluorinated polyoxetane that is bound into the polyester or other polymer. It is highly preferred to react the hydroxyl terminated partially fluorinated polyoxetane with at least 2 moles of carboxylic acid from a polycarboxylic acid or its anhydride per mole of hydroxyl groups from any polyol component under conditions effective to form an ester condensation product from the hydroxyl group of the polyoxetane and the carboxylic acid group of the polycarboxylic acid or its anhydride. More desirably the moles of carboxylic acid groups is at least 2.10 or 2.2 per mole of hydroxyl groups. In a preferred embodiment the amount of non-fluorinated polyol is small or zero to force the carboxylic acid groups to react with the hydroxyl group of the partially fluorinated polyoxetane. Desirably the moles of hydroxyls from non-fluorinated polyols are less than 0.5, more desirably less than 0.2 and preferably less than 0.1 per mole of hydroxyls from the partially fluorinated polyoxetane until after at least 25, 70, or 90 mole percent of the hydroxyl groups of the polyoxetane are converted to half esters with the polycarboxylic acid. It is also acknowledged that the percentage of the polymer (blocks) with said oxetane repeating units and the oxetane repeating units themselves may not be uniformly distributed through the bulk of the polyester. Said oxetane repeating units (blocks) are preferably disproportionately present at the surface of the coating due to the low surface tension of those repeating units. The amount of surface fluorine groups can be determined by XPS (x-ray photoelectron spectroscopy).

Alternatively the hydroxyl terminated partially fluorinated polyoxetane can be coupled to polyester blocks or polyester forming components via urethane linkages derived from the reaction of isocyanate groups from a di or polyisocyanate compound with the hydroxyl groups of the polyoxetane and hydroxy groups of the polyester. This would preferably be accomplished by the sequential reaction of a polyisocyanate with the hydroxyl groups of the hydroxyl terminated partially fluorinated polyoxetane to form an isocyanate terminated partially fluorinated polyoxetane. This would be favored by controlling the reaction so that at least 2 moles of isocyanate groups are present per mole of hydroxyl groups from the hydroxyl terminated partially fluorinated polyoxetane. Again it would be desirable to conduct the functionalization reaction in the absence of non-fluorinated polyols or limit the polyols to those amounts limited in the polyester coupling reaction to force a reaction between the isocyanates and the polyoxetane. After the isocyanate-terminated polyoxetane is formed (desirably at least 25, 50, 70 or 90 mole percent of the hydroxyls of the polyoxetane would be converted to urethane linkages) the polyester blocks could be added by two alternative procedures. A diol or polyol could be reacted with the isocyanate terminated polyoxetane to form a hydroxyl terminated polyoxetane, and thereafter additional diacids and diols could be added to the urethane functionalized polyoxetane through traditional ester forming reactions as previously taught. Alternatively the isocyanate terminated polyoxetane could be reacted with preformed polyesters (made by condensation or catalyzed ring opening polymerizations) to add polyester blocks via a second urethane linkage from the second isocyanate group of the polyisocyanate. The number average molecular weight of the polyester blocks, whether preformed or formed in situ, and whether added via ester linkages or urethane linkages would desirably be from about 100 to 5,000 or 20,000. It is understood that in all these reactions the possibility exists that some of the polyester molecules will not include any polyoxetane.

Alternatively to first reacting the di or polyisocyanate compound with the polyoxetane, one could first react the isocyanate compound with a polyester forming reactive isocyanate groups on the polyester and then coupling the reactive isocyanate groups on the polyester with the hydroxyl groups on the polyoxetane. It is anticipated that this alternative reaction scheme would not be as effective in coupling the polyoxetane to the polyester as the reactions between the di or polyisocyanate first with the polyoxetane.

The di or polyisocyanate compound can generally be any compound of the formula X-$(NCO)_y$ where y is an integer above 2 and X is an aliphatic group of 4 to 100 carbon atoms, an aromatic group of 6 to 20 carbon atoms, or a combination of alkyl and aromatic groups or alkyl substituted aromatic or aromatic substituted alkyl of 7 to 30 carbon atoms or the di or polyisocyanate compound could be oligomers thereof, These isocyanate compounds are well known to the art. Preferred ones are 4',4-methylene diphenyl isocyanate (MDI) as well as polymeric MDI, which is a liquid rather than a crystalline solid, toluene diisocyanate, 1,6-hexane diisocyanate, isophorone diisocyanate (preferred), trimethylhexane diisocyanate, etc.

The amount of partially fluorinated polyoxetanes in said polyester is desirably from about 0.05 or 0.1 to about 10, 15 or 50 weight percent based on the weight of the polyester including the polyoxetane portion. The polyester can be diluted with other components (including non-fluorinated polyesters) while preparing a coating or other polymer composition. The repeating units from a polyester are desirably from about 50 to about 99.8 weight percent of the poly-ester and more desirably from about 85 or 90 to about 99 weight percent. The amount of the oxetane repeating units having at least one pendant $CH_2$—O—$(CH_2)_n$Rf group is desirably from about 0.05 or 0.1 to about 10 or 15 parts by weight and more desirably from about 0.1 to about 10 or 15 parts by weight per 100 parts total weight of the final coating or molded article from these polyesters. Of course if the hydroxyl terminated polymer(s) including repeating units from said oxetane has a significant amount of repeating units from tetrahydrofuran or other repeating unit therein, the hydroxyl terminated polyoxetane's weight will exceed that of said oxetane repeating units.

Additionally other conventional additives may be formulated into the polyester for particular applications. Examples include viscosity modifiers, antioxidants, antiozonants, processing aids, pigments, fillers, ultraviolet light absorbers, adhesion promoters, emulsifiers, dispersants, solvents, crosslinking agents, etc.

The polyesters may be used in any traditional polyester application including as a molding material or a coating material. When used as a coating material the substrates may be any material, which would benefit from a low surface energy, hydrophobic properties including stain resistance or dry-erase, and low coefficient of friction. Examples of substrates that can be coated with coating compositions derived from these polyesters include cellulosic products (coated and uncoated paper, boardstock, cardboard, wood and paneling); fibers; synthetic polymers (including polyolefins, polyesters, polycarbonates, polystyrene, poly (methacrylates) and especially highly filled or highly plasticized ones which are more porous; towards stains e.g. polyvinyl chloride); metals (requiring temporary or permanent protection from stains); and ceramics.

The polyesters of this application are useful as components in molding resins, components in coating, etc where low surface tension and/or low coefficient of friction is desired. The amount of partially fluorinated oxetane repeating units can be controlled by varying their content in the polyoxetane or by varying the amount of polyester components. The polyesters can include hydrophobic or hydrophilic (or polar and/or nonpolar) moieties to vary the compatibility of the polyester with other components. The polyester can be used as a thermoplastic resin or reacted into thermoset compositions (e.g. thermoset polyester-amine, polyurethane, or epoxy).

The polyesters of the present invention are particularly useful in preparing dry erase writing surfaces (including boards, posters, papers, clipboards, menus, etc.) wallcoverings, anti graffiti surfaces e.g. in public areas including restrooms, and in kitchens and food preparation areas. Stain resistant laminates from these polyesters, can be used in the manufacture of tablecloths, shoe uppers, luggage exteriors, upholstery, vehicle interiors and seats, golf bags and other sporting goods and so forth.

The following examples will serve to illustrate the present invention with more particularity to those skilled in the art.

Preparation of Poly-Fox Materials (U.S. Pat. No. 5,650,483)

A 10 L jacketed reaction vessel with a condenser, thermocouple probe, and a mechanical stirrer was charged with anhydrous methylene chloride (2.8 L), and 1,4-butanediol (101.5 g, 1.13 moles). $BF_3THF$ (47.96 g, 0.343 moles) was then added, and the mixture was stirred for 10 minutes. A solution of 3-Fox (3,896 g. 21.17 moles) in anhydrous methylene chloride (1.5 L) was then pumped into the vessel over 5 hours. The reaction temperature was maintained between 38 and 42° C. throughout the addition. The mixture was then stirred at reflux for an additional 2 hours, after which H NMR indicated >98% conversion. The reaction was quenched with 10% aqueous sodium bicarbonate (1 L), and the organic phase was washed with 3% aq. HCl (4 L) and with water (4 L). The organic phase was dried over sodium sulfate, filtered, and stripped of solvent under reduced pressure to give 3,646 g (91.2%) of title glycol, a clear oil. NMR: The degree of polymerization (DP) as determined by TFAA analysis was 15.2 which translates to an equivalent weight of 2804. The THF content of this glycol, as determined by 1 H NMR, was 2.5% wt THF (6.2% mole THF). This example was included to teach how to polymerize partially fluorinated oxetane polymers.

EXAMPLE I

FOX CONTAINING POLYESTER

Two different hydroxyl terminated partially fluorinated polyoxetanes were used to prepare four different polyester materials according to this invention. The first polyoxetane had 6 mole % repeating units from tetrahydrofuran (THF) with the rest of the polymer being initiator fragment and repeating units from 3-FOX where n=1, Rf is $CF_3$, and R is $CH_3$. The number average molecular weight of the first polyoxetane was 3400. The second polyoxetane had 26 mole % of its repeating units from tetrahydrofuran with the residual being the initiator fragment and repeating units from 3-FOX. 3-FOX is also known as 3-(2,2,2-trifluoroethoxylmethyl)-3-methyloxetane.

EXAMPLE II

COATINGS FROM THE POLYESTER

The first and second oxetane polymers were reacted with at least a 2 equivalent excess (generally 2.05–2.10 excess) of adipic acid in a reactor at 455 F for 3.5 hours to form a polyoxetane having the half ester of adipic acid as end groups. NMR analysis was used to confirm that substantially all the hydroxyl groups were converted to the ester groups. The average degree of polymerization of the first oxetane polymer was reduced from 18 to 14 during the reaction with adipic acid. The average degree of polymerizations of the second oxetane polymer remained at 18 throughout the reaction. The reactants were then cooled to 300 F.

The adipic acid functionalized polyoxetane was then reacted with additional diacids and diols to form polyester blocks. The diacids were used in amounts of 24.2 parts by weight of adipic acid and 24.5 parts by weight of isophthalic acid relative to the diols which were used in amounts of 20.5 parts by weight of cyclohexanedimethanol, 14.8 parts by weight of neopentyl glycol, and 16.0 parts by weight of tri-methylol propane. The relative amounts of the adipate ester of the oxetane polymer and the polyester forming components was adjusted to result in polyesters with either 2 or 4 weight percent of partially fluorinated oxetane repeating units. The reaction temperature was lowered to 420 F for the additional diacids and diols. The reaction was continued until the calculated amount of water was generated. The finished batch sizes were from 20 to 30 gallons.

The four polyesters (2 or 4 wt. % oxetane and 6 or 26 mole percent of the polyoxetane being repeating units from THF) were formulated into solvent based coating compositions as shown in Table 1. The Resimene 747 resin is an amino resin curative for polyester resins. The PTSA is paratoluene sulfonic acid catalyst (40 Wt. % active in isopropanol). The coating compositions varied in the amount of polyoxetane in the polyester, the amount of tetrahydrofuran repeating units in the polyoxetane, and the weight ratio of Resimene (melamine formaldehyde curative) to polyester.

TABLE I

| Components | Sample 1 | Sample 2 | Sample 3 | Sample 4 | Sample 5 |
| --- | --- | --- | --- | --- | --- |
| n-propyl acetate | 8.3 | 8.3 | 8.3 | 8.3 | 8.5 |
| THF | .925 | 10.9 | 10.9 | 10.9 | 10.9 |
| Polyester 2 wt. % 1st oxetane | 18.95 | 0 | 0 | 0 | 16.8 |
| Polyester 4 wt. % 1st oxetane | 0 | 0 | 0 | 18.95 | 0 |
| Polyester 2 wt. % 2nd oxetane | 0 | 18.95 | 0 | 0 | 0 |
| Polyester 4 wt. % 2nd oxetane | 0 | 0 | 18.95 | 0 | 0 |
| Resimene 747 | 18.55 | 18.55 | 18.55 | 18.55 | 20.15 |
| PTSA | 3.3125 | 3.3125 | 3.3125 | 3.3125 | 3.6 |
| Surface F of the cured coating in atomic % | N/A | 14.4 | 15.8 | 18.4 | 18.9 |

| Components | Sample 6 | Sample 7 | Sample 8 | Sample 9 | Sample 10 |
| --- | --- | --- | --- | --- | --- |
| n-propyl acetate | 8.5 | 8.5 | 8.5 | 8.75 | 8.75 |
| THF | 10.9 | 10.9 | 10.9 | 11.0 | 11.0 |
| Polyester, 2 wt. % 1st oxetane | 0 | 0 | 0 | 0 | 0 |
| Polyester, 4 wt. % 1st oxetane | 0 | 0 | 16.8 | 14.6 | 0 |
| Polyester, 2 wt. % 2nd oxetane | 16.8 | 0 | 0 | 0 | 0 |
| Polyester, 4 wt. % 2nd oxetane | 0 | 16.8 | 0 | 0 | 14.6 |
| Resimene 747 | 20.15 | 20.15 | 20.15 | 21.75 | 21.75 |
| PTSA | 3.6 | 3.6 | 3.6 | 3.9 | 3.9 |
| Surface F of the cured coating in atomic % | 15.6 | 17.2 | 18.8 | 17.1 | 18.6 |

The units in the table above are U.S. pounds.

The technology shown in Table 1 results in high amounts of fluorine on the surface of the coating and the high amounts of fluorine are associated with low surface energy, good abrasion resistance, and easy cleaning. As seen in Table I the XPS results for the first 100 angstroms of the top surface vary from about 14 to about 19 atomic percent. Similar recipes wherein the polyoxetane had only hydroxyl end groups have resulted in about 7 to 9 atomic percent fluorine on the surface as determined by XPS. This is significant increase in the surface fluorine content without requiring additional fluorinated oxetane polymer.

While in accordance with the patent statutes the best mode and preferred embodiment have been set forth, the scope of the invention is not limited thereto, but rather by the scope of the attached claims.

What is claimed is:

1. A reactive polyester resin, comprising:
   a) at least one polyoxetane block of repeating units derived from polymerizing at least one oxetane monomer having at least one pendant —$CH_2$—O—$(CH_2)_n$—Rf group, and
   b) at least one polyester block having a molecular weight above 100,
      wherein a hydroxyl group of said polyoxetane block is preacted with a dicarboxylic acid having from about 3 to about 30 carbon atoms or an anhydride thereof to form a half ester linkage and a carboxylic acid terminal group and thereafter reacting said terminal carboxylic acid group with either i) said polyester block or ii) with at least one polyol having from 2 to about 20 carbon atoms and at least one polycarboxylic acid or anhydride thereof having from about 3 to about 30 carbon atoms which form said polyester block,
      wherein said Rf group, independently on each repeating unit, being a linear or branched alkyl group of 1 to 20 carbon atoms with a minimum of 25 percent of the hydrogen atoms of said alkyl group being replaced by F, or said Rf group, independently, being a perfluorinated polyether having from 4 to 60 carbon atoms, and n being from 1 to 3.

2. The polyester according to claim 1 wherein said oxetane block is a copolymer including repeating units from said at least one oxetane monomer and from tetrahydrofuran.

3. The polyester according to claim 1, wherein said at least one oxetane monomer of said polyoxetane block has one or two pendant —$CH_2$—O—$(CH_2)_n$— Rf group per repeating unit, and wherein each n and each Rf is the same or different.

4. The polyester according to claim 1, wherein said polyoxetane block has a molecular weight of at least about 1,000, wherein said Rf group, independently, on each repeating unit has a minimum of 75% of the hydrogen atoms of said alkyl group being replaced by F atoms, wherein said Rf is an alkyl group having from 1 to 10 carbon atoms, and optionally wherein said polyoxetane is a copolymer derived from said oxetane monomer and from a cyclic ether monomer having from 2 to 4 carbon atoms in the ring.

5. The polyester according to claim 4, wherein said polyoxetane is said copolymer, and wherein said cyclic ether is tetrahydrofuran.

6. The polyester according to claim 5 wherein said ii) polyester block is derived from 2,2-dimethyl-1,3-propanediol, trimethylol propane, cyclohexane dimethanol, adipic acid and isophthalic acid monomers, and wherein said dicarboxylic acid preacted with said hydroxyl group of said polyoxetane is adipic acid.

7. The polyester according to claim 4,
   wherein said polyoxetane block has repeat units of the formula

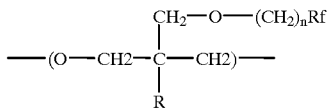

wherein R is hydrogen or an alkyl having from 1 to 6 carbon atoms.

8. The polyester according to claim 7, wherein said Rf group comprises a perfluorinated alkyl group.

9. The polyester according to claim 8, wherein said polyoxetane block includes repeating units from said oxetane monomer and repeat units derived from tetrahydrofuran.

10. The polyester according to claim 1, wherein said at least one oxetane monomer of said polyoxetane block has only one pendent-$CH_2$—O—$(CH_2)_n$—Rf group per repeating unit.

11. A process for forming at least one polyester block on a preformed polyoxetane polymer comprising;
    a) providing a hydroxyl terminated polyoxetane including repeating units derived from polymerizing at least one oxetane monomer having at least one pendant —$CH_2$—O—$(CH_2)_n$— Rf group,
       wherein said Rf group, independently, on each repeating unit is a linear or branched alkyl group of 1 to 20 carbon atoms with a minimum of 25 percent of the hydrogens of said alkyl group being replaced by F, or said Rf group independently being a perfluorinated polyether having from 4 to 60 carbon atoms, and n, independently being from 1 to 3,
    b) reacting a polycarboxylic acid or an anhydride thereof having from about 3 to about 30 carbon atoms with the hydroxyl group or groups of said hydroxyl terminated polyoxetane under effective reaction conditions to form a half ester linkage and a carboxylic acid terminated polyoxetane,
    c) thereafter reacting said carboxylic acid terminated polyoxetane with either, (i) a polyester formed from a condensation reaction, or (ii) in the presence of a polyol monomer having from 2 to about 20 carbon atoms and a dicarboxylic acid monomer or an anhydride thereof having from about 3 to about 30 carbon atoms to form at least one polyester block on said polyoxetane.

12. The process according to claim 11, wherein said (b) polycarboxylic acid reacted with said polyoxetane and said dicarboxylic acid forming said (c) (ii) polyester block can be the same or different.

13. A process according to claim 12, wherein said hydroxyl terminated polyoxetane is a copolymer including repeating units from said at least one oxetane monomer and from tetrahydrofuran.

14. A process according to claim 12, wherein said polyoxetane has a molecular weight of at least about 1,000, wherein said Rf group, independently, on each repeating unit has a minimum of 75% of the hydrogen atoms of said alkyl group being replaced by F atoms, wherein said Rf is an alkyl group having from 1 to 10 carbon atoms, and optionally wherein said polyoxetane is a copolymer derived from said oxetane monomer and from a cyclic ether monomer having from 2 to 4 carbon atoms in the ring.

15. A process according to claim 14, wherein said hydroxyl group of said hydroxyl terminated polyoxetane is reacted with adipic acid, wherein said polyoxetane is said copolymer, wherein said cyclic ether is tetrahydrofuran, and wherein said ii) polyester block is derived from 2,2-dimethyl-1,3-propanediol, trimethylol propane, cyclohexane dimethanol, adipic acid and isophthalic acid.

16. A process according to claim 15, wherein said polyoxetane comprises from about 0.05 to about 50 weight percent of said polyester block-polyoxetane.

17. A process according to claim 16, including reacting said polyester block polyoxetane with an amino resin to form a cured composition, and wherein said amino resin is alkylated benzoguanamine-formaldehyde, alkylated urea-formaldehyde, alkylated melamine-formaldehyde, or combinations thereof.

18. A process according to claim 14, including reacting said polyester block polyoxetane with an amino resin to form a cured composition, and wherein said amino resin is alkylated benzoguanamine-formaldehyde, alkylated urea-formaldehyde, alkylated melamine-formaldehyde, or combinations thereof.

19. A process according to claim 12, including reacting said polyester block polyoxetane with an amino resin to form a cured composition.

20. A process according to claim 11, including reacting said polyester block polyoxetane with an amino resin.

21. A process according to claim 11 wherein the carboxylic acid groups of said polycarboxylic acid or anhydride thereof are reacted with the total hydroxyl groups in a mole ratio of at least 2:1 and less than 0.1 moles of hydroxyls from non-fluorinated polyols are present during said reaction to form a carboxylic acid terminated polyoxetane per mole of hydroxyls from said polyoxetane.

22. A laminate comprising:
   a substrate; and
   a coating on said substrate comprising the reaction product of at least one amino resin and at least one reactive polyester resin, said reactive polyester resin comprising
      a) at least one polyoxetane block of repeating units derived from polymerizing at least one oxetane monomer having at least one pendant —CH$_2$—O—(CH$_2$)$_n$— Rf group, and
      b) at least one polyester block having a molecular weight above 100,
         wherein a hydroxyl group of said polyoxetane block is preacted with a dicarboxylic acid having from about 3 to about 30 carbon atoms or an anhydride thereof to form a half ester linkage and a carboxylic acid terminal group and thereafter reacting said terminal carboxylic acid group with either i) said polyester block or ii) with at least one polyol having from 2 to about 20 carbon atoms and at least one polycarboxylic acid or anhydride thereof having from about 3 to about 30 carbon atoms which form said polyester block,
         wherein said Rf group, independently on each repeating unit, being a linear or branched alkyl group of 1 to 20 carbon atoms with a minimum of 25 percent of the hydrogen atoms of said alkyl group being replaced by F, or said Rf group, independently, being a perfluorinated polyether having from 4 to 60 carbon atoms, and n being from 1 to 3.

23. A laminate according to claim 22, wherein said at least one oxetane monomer of said polyoxetane block has one or two pendant —CH$_2$—O—(CH$_2$)$_n$— Rf group per repeating unit, and wherein each n and each Rf is the same or different.

24. A laminate according to claim 22, wherein said polyoxetane has a molecular weight of at least about 1,000, wherein said Rf group, independently, on each repeating unit has a minimum of 75% of the hydrogen atoms of said alkyl group being replaced by F atoms, wherein said Rf is an alkyl group having from said 1 to 10 carbon atoms, and optionally wherein said polyoxetane is a copolymer derived from said oxetane monomer and from a cyclic ether monomer having from 2 to 4 carbon atoms in the ring.

25. A laminate according to claim 24,
wherein said polyoxetane block has repeat units of the formula

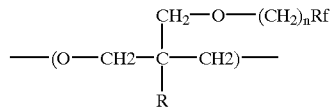

wherein R is hydrogen or an alkyl having from 1 to 6 carbon atoms, and
wherein said amino resin is alkylated benzoguanamine-formaldehyde, alkylated urea-formaldehyde, alkylated melamine-formaldehyde, or combinations thereof.

26. A laminate according to claim 25, wherein said polyester block is derived from 2,2-dimethyl-1,3-propanediol, trimethylol propane, cyclohexane dimethanol, adipic acid and isophthalic acid monomers, and wherein diacid preracted with said hydroxyl group of said polyoxetane is adipic acid.

27. A laminate according to claim 25, wherein said Rf group comprises a perfluorinated alkyl group and wherein said polyoxetane block includes repeating units from said oxetane monomer and repeat units derived from tetrahydrofuran.

28. A composition, comprising:
   a crosslinked reaction product of at least one amino resin crosslinking agent and at least one reactive polyester resin, said reactive polyester resin comprising
      a) at least one polyoxetane block of repeating units derived from polymerizing at least one oxetane monomer having at least one pendant —CH$_2$—O—(CH$_2$)$_n$— Rf group, and
      b) at least one polyester block having a molecular weight above 100,
         wherein a hydroxyl group of said polyoxetane block is preacted with a dicarboxylic acid having from about 3 to about 30 carbon atoms or an anhydride thereof to form a half ester linkage and a carboxylic acid terminal group and thereafter reacting said terminal carboxylic acid group with either i) said polyester block or ii) with at least one polyol having from 2 to about 20 carbon atoms and at least one polycarboxylic acid or anhydride thereof having from about 3 to about 30 carbon atoms which form said polyester block,
         wherein said Rf group, independently on each repeating unit, being a linear or branched alkyl group of 1 to 20 carbon atoms with a minimum of 25 percent of the hydrogen atoms of said alkyl group being replaced by F, or said Rf group, independently, being a perfluorinated polyether having from 4 to 60 carbon atoms, and n being from 1 to 3.

29. A composition according to claim 28, wherein said polyoxetane has a molecular weight of at least about 1,000, wherein said Rf group, independently, on each repeating unit has a minimum of 75% of the hydrogen atoms of said alkyl group being replaced by F atoms, wherein said Rf is an alkyl group having from said 1 to 10 carbon atoms, and optionally wherein said polyoxetane is a copolymer derived from said oxetane monomer and from a cyclic ether monomer having from 2 to 4 carbon atoms in the ring.

30. A composition according to claim 29, wherein said polyoxetane block has repeat units of the formula

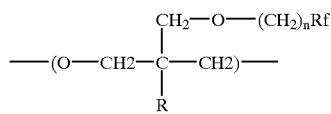

wherein R is hydrogen or an alkyl having from 1 to 6 carbon atoms.

31. A composition according to claim 30, wherein said Rf group comprises a perfluorinated alkyl group and wherein said polyoxetane block includes repeating units from said oxetane monomer and repeat units derived from tetrahydrofuran.

32. A composition according to claim 31, wherein said polyester block is derived from 2,2-dimethyl-1,3-propanediol, trimethylol propane, cyclohexane dimethanol, adipic acid and isophthalic acid monomers, and wherein said diacid prereacted with said hydroxyl group of said polyoxetane is adipic acid.

* * * * *